United States Patent [19]

Miller

[11] Patent Number: 5,137,645
[45] Date of Patent: Aug. 11, 1992

[54] DECLINING RATE FILTER SYSTEMS AND METHODS

[75] Inventor: Jeffery H. Miller, Midlothian, Va.

[73] Assignee: Infilco Degremont Inc., Richmond, Va.

[21] Appl. No.: 723,197

[22] Filed: Jun. 28, 1991

[51] Int. Cl.⁵ .......................................... B01D 24/40
[52] U.S. Cl. ........................... 210/793; 210/275; 210/293
[58] Field of Search ............ 210/275, 277, 793, 196, 210/792, 293

[56] References Cited

U.S. PATENT DOCUMENTS

| | | | |
|---|---|---|---|
| 2,559,784 | 7/1951 | Moore | 210/275 |
| 2,879,891 | 3/1959 | Beohner et al. | 210/277 |
| 2,879,893 | 3/1959 | Stebbins | 210/277 |
| 3,134,735 | 5/1964 | Greenleaf, Jr. | 210/275 |
| 3,260,366 | 7/1966 | Duff et al. | 210/277 |
| 3,282,432 | 11/1966 | Greenleaf, Jr. | 210/275 |
| 3,342,334 | 9/1967 | Soriente et al. | 210/277 |
| 3,502,212 | 3/1970 | Ueda | 210/277 |
| 3,771,655 | 11/1973 | Hudson, Jr. | 210/264 |
| 3,957,637 | 5/1976 | Morey | 210/808 |
| 4,537,687 | 8/1985 | Piper | 210/793 |

*Primary Examiner*—Stanley S. Silverman
*Assistant Examiner*—Cynthia L. Nessler
*Attorney, Agent, or Firm*—Carroll F. Palmer

[57] ABSTRACT

Declining rate filtration systems using influent siphoning for influent flow to a bed of particulate filter media are improved by using at least two influent siphons with each filter bed. In use of such improved systems, influent is siphoned from a flume source or the like to the filter bed after backwashing of the filter media through a first siphon and, thereafter as headloss in the filter bed increases, further influent from the source is siphoned to the filter bed through a second siphon that has an effective minimum cross-sectional area substantially greater than that of the first siphon.

5 Claims, 3 Drawing Sheets

DECLINING RATE FILTER SYSTEMS AND METHODS

BACKGROUND OF THE INVENTION

1. Field of the Invention

This invention relates broadly to gravity backwash filters and gravity filtering and backwashing methods. More particularly, it concerns so-called variable declining rate filtration systems and methods.

2. Description of the Prior Art

Granular media filters used for the removal of suspended material from water, waste water, or other fluids have been operated in many modes such as constant pressure, constant rate, constant level, influent flow splitting and variable declining rate filtration (VDRF). Of these, VDRF offers desirable advantages (see the EPA technology transfer seminar publication entitled "Wastewater Filtration Design Considerations" of July 1974, pages 28-32). The present invention provides improvement in VDRF apparatus and methods.

The construction of VDRF filters has taken many forms, the majority of which use valves to control flows during the filtering and backwashing cycles. However, the use of siphons is advantageous because of their simpler mechanical construction and reliability.

Filter apparatus using siphons for flow control is described in U.S. Pat. Nos. 3,134,735; 3,282,432; 3,312,348 and 4,122,013. However, in such apparatus, only influent flow splitting operation is possible limiting the usefulness thereof. A different application of siphons having several unique features in accordance with the present invention retains the advantages of siphons and allows the use of VDRF operation.

The aforesaid EPA publication on page 30, shows the conventional configuration for the VDRF type filter in which the effluent discharge level control weir is below the wash trough neccessitating the use of a backwash supply under pressure, usually a pumped supply. However, it is known to have an effluent weir above the wash trough thereby providing without use of pumps the necessary pressure for backwashing (see U.S. Pat. Nos 3,771,655 and 4,537,687). The present invention uses this type of wash pressure in providing new advancements in the filtering art.

Another problem encountered with declining rate filters is the need to restrict the influent flow rate to the design maximum of the filter during periods of low media headloss following a backwash. In the past, this has been attained by (a) use of a single inlet siphon equipped with flow restricting means, (b) flow restricting means at the outlet of the filter basin or (c) a partializing control on a single influent siphon. The present invention provides new, improved means for restricting influent flow rate in declining rate filters during periods of their operation under low media headloss.

OBJECTS

A principal object of the invention is the provision of improvements in variable declining rate filtration (VDRF) systems and methods.

Further objects include the provision of:

1. New improvements in the use of syphons for intermittent restriction of influent flow in open gravity, VDRF filters.

2. Such filters and related filtration methods that do not require use of pumps to provide pressure necessary to backwashing.

3. Improvements in VDRF systems and methods that eliminate the need for influent flow restriction devices, e.g., valve or orifice plate, to limit maximum flow rate.

Other objects and further scope of applicability of the present invention will become apparent from the detailed description given herein; it should be understood, however, that the detailed descriptions, while indicating preferred embodiments of the invention are given by way of illustration only, since various changes and modifications within the spirit and scope of the invention will become apparent from such descriptions.

SUMMARY OF THE INVENTION

The objects are accomplished, in part, in accordance with the invention by the provision of a declining rate filter system including a filter cell containing a bed of particulate filter media defined by an upper bed elevation and a lower bed elevation, an underdrain below the lower bed elevation, effluent means that communicates with the underdrain to discharge effluent from the system at a discharge elevation above the upper bed elevation, flume means positioned at an input election above the discharge elevation carrying a stream of influent, a backwash siphon to discharge backwash water from the system, vacuum means and valve means for applying vacuum to siphons of the system from the vacuum means or for opening the siphons to ambient.

The improved filter system comprises first and second influent siphons, both arranged to conduit influent from the flume means directly into the filter cell. The first influent siphon is defined by a first inlet end positioned within the stream of influent, a first outlet end positioned at a first outlet elevation below the discharge elevation and a first intermediate section that joins the first inlet end to the first outlet end. The first intermediate section includes a portion that rises to an upper elevation above the first inlet end.

The second influent siphon is defined by a structure like the first influent siphon except that its maximum fluid handling capacity is substantially greater than the maximum fluid handling capacity of the first influent siphon at equivalent pressure differentials because the effective minimum cross-sectional area of the second siphon is substantially greater than that of the first siphon.

Conduit means connects the first and second intermediate section portions of the first and second siphons to the vacuum and valve means.

The objects of the invention are further accomplished by the provision of new methods of conducting declining rate filtration by flowing a stream of influent to be filtered to a confining station of a filtration site that includes a filter bed of particulate filter media, siphoning influent from the confining station to the filter bed after backwashing of the filter media through a first siphon and thereafter as headloss in the filter bed increases, siphoning influent from the confining station to the filter bed through a second siphon that has an effective minimum cross-sectional area substantially greater than that of the first siphon.

BRIEF DESCRIPTION OF THE DRAWINGS

A more complete understanding of the invention can be obtained by reference to the accompanying drawings in which.

DESCRIPTION OF THE PREFERRED EMBODIMENTS

Figures 1, 2:
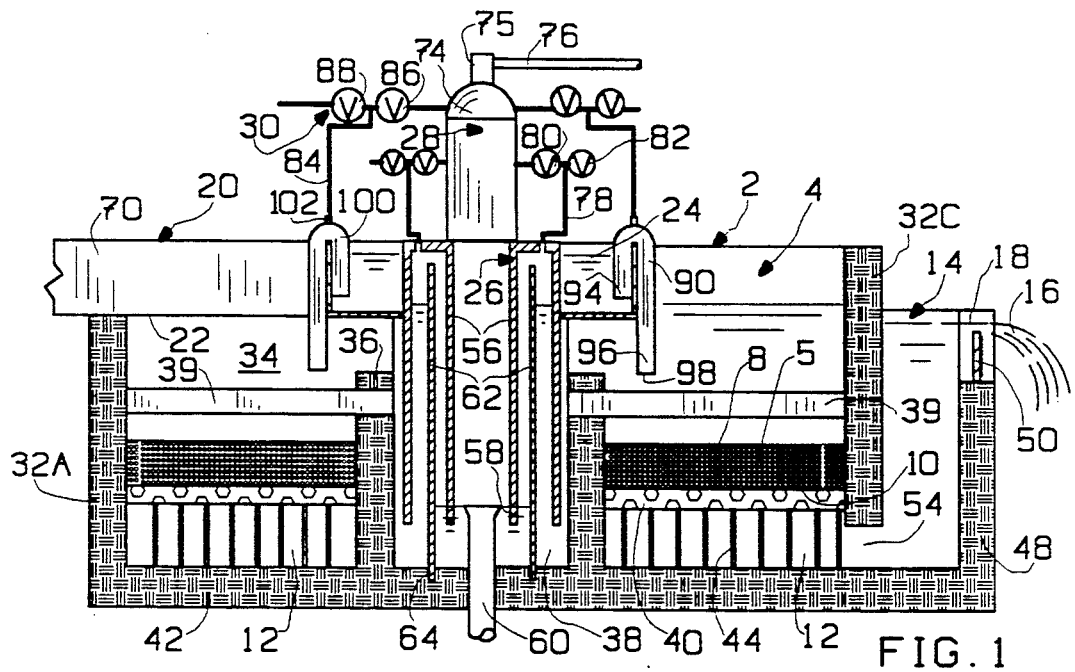
FIG. 1 is a lateral, sectional view of a declining rate filter system in accordance with the invention operating in the filter.
FIG. 2 is a plan view, partially in section, of the filter system of FIG. 1.

Referring in detail to the drawings, the declining rate filter system 2 includes four filter cells 4 containing beds 5 of particulate filter media 6 defined by an upper bed elevation 8 and a lower bed elevation 10. Underdrains 12 communication with effluent means 14 to discharge effluent 16 from the system 2 at a discharge elevation 18 above the upper bed elevations 8.

System 2 further includes flume means 20 positioned at an input elevation 22 above the discharge elevation 18 to carry a stream of influent 24, backwash siphons 26 to discharge backwash water from system 2, vacuum means 28 and valve means 30 for applying vacuum to system siphons from the vacuum means 28 or for opening the siphons to ambient.

The cells 4 are defined by outside walls 32A, 32B, 32C and 32D plus inside walls 34. Forebay walls 36 within the cells 4 separate the forebays 38 from the filter beds 5. Wash troughs 39 extend through the walls 36 to convey wash water from above the beds 5 into the forebays 38.

The filter media 6 are supported on porous webs 40 which, in turn, are supported above the cell floor 42 by spacers 44.

The effluent means 14 includes side walls 46, end wall 48, weir 50 positioned in end wall slot 52 and inlet opening 54 formed in the bottom of cell wall 32C. The effluent means may be designed in any shape or volumetric capacity. The weir 50 is advantageously constructed so that its height can be varied to raise or lower the discharge elevation 18.

The backwash siphons 26 comprise inverted columnar members 56, whose lower ends 58 extend below the upper extension of funnel drain 60, and inner walls 62 that have their lower ends 64 grouted into slots in the cell floor 42. The siphons 26 are supported by an annular core 66 which is grouted to the inner ends 68 of the inside walls 34.

Flume means 20 comprises influent flume 70 and annular distribution channel 72, both supported by suitable cut-out portions in the inside walls 34 and in outside wall 32A.

The vacuum means 28 comprises a vacuum tank 74 connected via nipple 75 and pipe 76 to a vacuum pump (not shown).

Value means 30 comprises first siphon pipes 78, suction valves 80 and exhaust valves 82 plus second siphon pipes 84, suction valves 86 and exhaust valves 88.

Each filter cell 4 of the improved filter system 2 is provided with a first influent siphon 90 and a second influent siphon 92, both arranged to conduit influent 24 from the flume means 20 into respective filter cells 4. The first influent siphons 90 are defined by a first inlet end 94 positioned within the stream of influent 24, a first outlet end 96 positioned at a first outlet elevation 98 below the discharge elevation 18 and a first intermediate section 100 that joins the first inlet end 94 to the first outlet end 96. Each first intermediate section 100 includes a portion that rises to an upper elevation above the first inlet end 94 and carries a nipple 102 by which the siphons 90 are connected to siphon pipes 84.

The second influent siphons 92 are defined by a structure like the first influent siphons 90 except that their maximum fluid handling capacity is substantially greater than the maximum fluid handling capacity of the first influent siphon at equivalent pressure differentials because the effective minimum cross-sectional area of the second siphons 92 are substantially greater than that of the first siphons 90.

Figure 3:
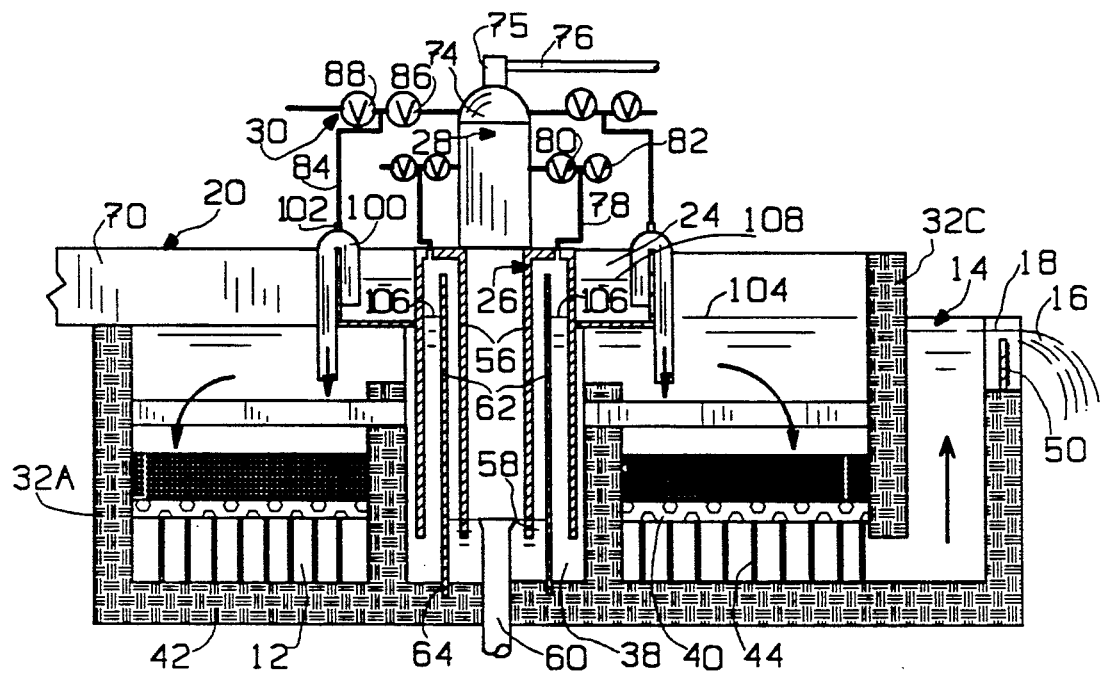
FIG. 3 is a lateral sectional view similar to FIG. 1 showing initial filtration operation in all cells.

Initial filtration operation of the VDRF system 2 is illustrated in FIG. 3 with the water level 104 in all cells being substantially the same and slightly higher than discharge elevation 18. To reach this point, water is introduced into the cells until they fill enough to cover the outlet ends 96 of the influent siphons 90 and 92. This can be accomplished in various ways, e.g., by slots (not shown) in the top edge of the annular distribution channel 72 to let influent 24 flow into the cells 4. With their outlet end immersed in water, the siphons 90 and 92 can a activated.

Since the headlosses in all cells 4 at this point are at a minimum, only siphons 90 in all cells 4 are actuated by opening valves 86, with valve 88 closed, so that water rises in the siphons 90 until they are completely filled. Siphoning action in the siphons 90 begins so cells 4 are charged with influent 24 passing through the siphons from channel 72. The effective cross-section of the siphons 90 are designed to deliver influent at such rate that the influent level 104 in the cells and level 106 in the forebays 38 will be only slightly above the discharge elevation 18 when the headloss in the cells 4 is at a minimum as shown in FIG. 3. (The liquid level 104 in the left-hand cell 4 is not shown because of the presence of flume 70).

As filtration continues, accumulation of solids in the filter media 6 will cause the headloss in the filter beds 5 to increase, usually with such increase varying in the different cells 4. As this occurs, the liquid levels 104, 106 and 108 will rise.

At an appropriate time for each different cell 4, siphon 92 for a cell will be activated by opening valve 86 associated with such cell, with its valve 88 closed so that water rises in such siphon until it is completely filled. At the same time, siphon 90 for that cell is deactivated by opening its siphon's valve 88. The larger capacity siphon 92 delivers more influent into its cell 4 at lower pressure loss than siphon 90. Siphon 92 continues to operate as liquid levels 104 and 108 become closer thus reducing influent flow as required in declining rate operation. When flow through siphon 92 is essentially zero, backwashing of the associated cell is initiated.

Figure 4:
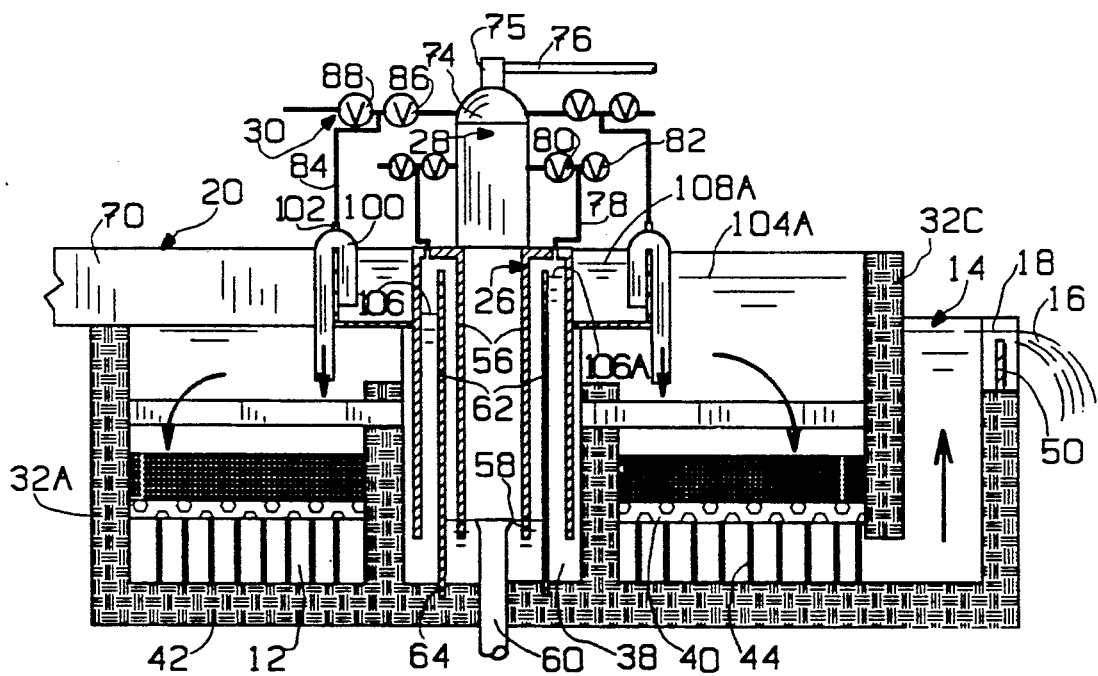
FIG. 4 is a lateral sectional view similar to FIG. 1 showing filtration operation with maximum head loss in the right-hand cell.
Figure 5:
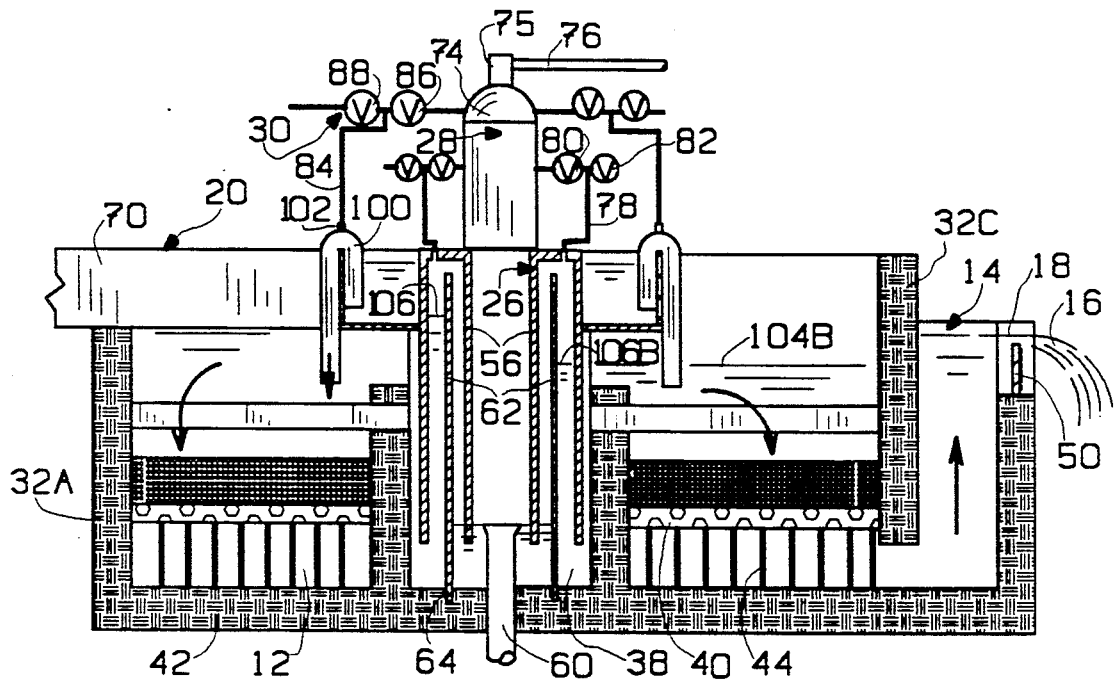
FIG. 5 is a lateral, sectional view similar to FIG. 1 showing drain in the right-hand cell and filtration operation in the remaining cells of the system.

FIG. 4 shows the right-hand cell with liquids levels 104A, 106A and 108A at the height attained for maximum headloss through the filter bed 5 of that cell, while the levels 104 (not shown) and 106 in the left-hand cell indicates that cell's headloss to still be below maximum. At this point, the right-hand cell is drained as shown in FIG. 5 by deactivation of both its siphons 90 and 92, dropping the liquid levels 104B and 106B below the discharge elevation 18.

Figure 6:
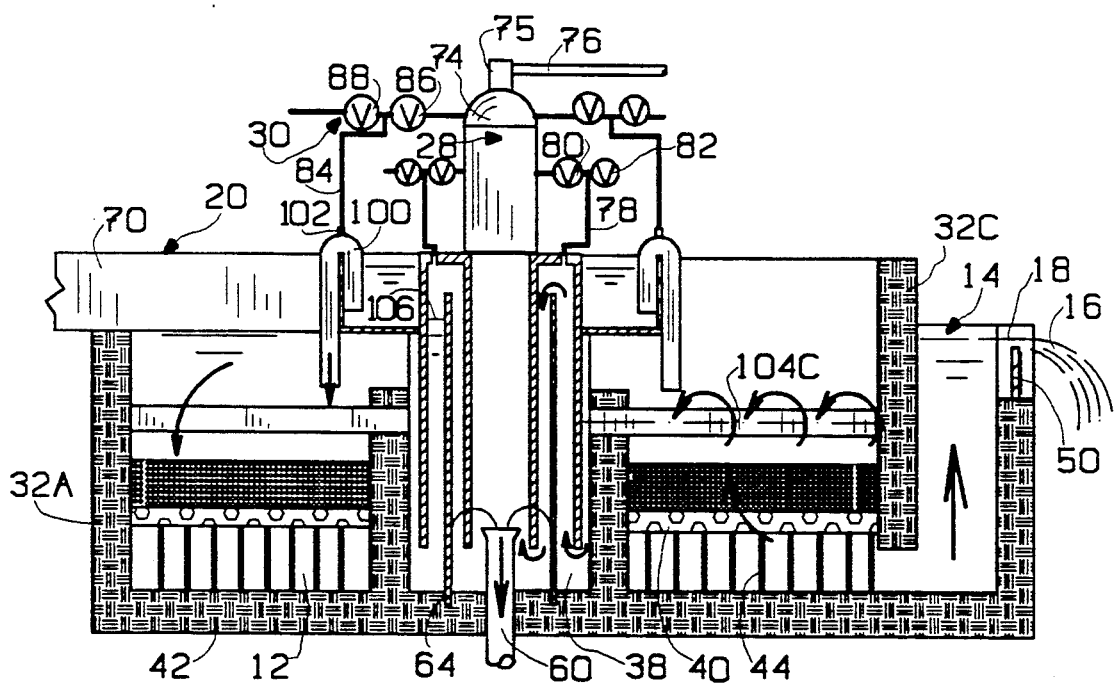
FIG. 6 is a lateral, sectional view similar to FIG. 1 showing backwashing in the right-hand cell and filtration operation in the remaining cells of the system.

FIG. 6 shows the right-hand cell undergoing backwashing. This is done by activation of the backwash siphon 26 for that cell. Thus, the vacuum valve 80 for that siphon 26 is opened, with valve 82 closed to fill it with liquid thereby causing part of the effluent from means 14 to flow, as indicated by the arrows, up through filter bed 5 into troughs 39 thence into forebay 38 and exit system 2 via backwash siphon 26 and discharge 60. After the cell backwash is completed, it is placed back in service by recharging the cell with influent as previously discussed. Each cell 4 in the system 2 is handled in like manner to periodically return them to minimum headloss condition.

In a typical mode of steady state operation of the new filter systems 2, one filter cell will be using siphon 90 with the other three using siphon 92. The cell using siphon 90 will be the one most recently backwashed. As filtering continues, common flume level will rise to a predetermined maximum. At this point, the filter cell that has been in operation in longest without backwashing will start backwashing. At the conclusion of this backwashing, the backwashed cell will start filtration with siphon 90. Also, at this time, the filter cell that had been using siphon 90 will switch to 92. This flow condition will continue until backwashing of such cell is again required.

While the filter systems 2 of the invention have been shown in the drawings to consist of concrete basins with common wall construction, such systems can be constructed in a round steel tank configuration or in a multiple tank arrangement as disclosed in brochure DB310 of Infilco Degremont Inc. entitled *Greenleaf Filter Control* and dated January 1991. Further, the new filter systems may be provided with (a) means (not shown) for air washing the filter media before and/or during backwash and/or (b) means (not shown) for agitating the upper layers of filter media. Also, the siphons 90 and 92 may be made of any suitable material and shape, e.g., circular, square, rectangular cross-section, etc.

I claim:

1. In a declining rate filter system including a filter cell containing a bed of particulate filter media defined by an upper bed elevation and a lower bed elevation, an underdrain below said lower bed elevation, effluent means that communicates with said underdrain to discharge effluent from said system at a discharge elevation above said upper bed elevation, flume means positioned at an input elevation above said discharge elevation carrying a stream of influent, a backwash siphon to discharge backwash water from said system, vacuum means, and valve means for applying vacuum to siphons of the system from said vacuum means or for releasing vacuum from said siphons, the improvement which comprises:

a first and second influent siphon both arranged to conduit influent from said flume means directly into said filter cell, said first influent siphon defined by a first inlet end positioned within said stream of influent, a first outlet end positioned at a first outlet elevation below said discharge elevation and a first intermediate section that joins said first inlet end to said first outlet end, said first intermediate section including a portion that rises to an upper elevation above said first inlet end, said second influent siphon defined by a second inlet end positioned within said stream of influent, a second outlet end positioned at a second outlet elevation below said discharge elevation and a second intermediate section that joins said second inlet end to said second outlet end, said second intermediate section including a portion that rises to an upper elevation above said second inlet end, the minimum cross-sectional area of the second siphon being substantially greater than the minimum cross-sectional area of the first siphon whereby the maximum fluid handling capacity of said second influent siphon is substantially greater than the maximum fluid handling capacity of said second influent siphon, and conduit means connecting said first and second intermediate section portions of said first and second siphons to said vacuum and valve means.

2. The filter system of claim 1 that includes at least one additional influent siphon similar to said first and second siphons of the same or different minimum cross-sectional area.

3. In a declining rate filtration method using siphoning steps for control of the flow of liquids in operation of the method, the improvement which comprises:

flowing a stream of influent to be filtered to a confining station of a filtration site that includes a filter bed of particulate filter media, siphoning influent from the confining station to the filter bed after backwashing of said filter media through a first siphon, filtering said influent siphoned by said first siphon through said filter bed until headloss in said filter bed increases to a predetermined amount, then siphoning influent from said confining station to said filter bed through a second siphon that has an effective minimum cross-sectional area substantially greater than that of said first siphon, and filtering said influent siphoned by said second siphon through said filter bed.

4. In a declining rate filtration method using siphoning steps for control of the flow of liquids in operation of the method, the improvement which comprises:

flowing a stream of influent to be filtered to a confining station of a filtration site that includes a filter bed of particulate filter media, siphoning influent from the confining station to the filter bed after backwashing of said filter media through a first siphon, filtering said influent siphoned by said first siphon through said filter bed until headloss in said filter bed increases to a predetermined amount, discontinuing said siphoning of influent through said first siphon, siphoning influent from said confining station to said filter bed through a second siphon that has an effective minimum cross-sectional areas substantially greater than that of said first siphon, and filtering said influent siphoned by said second siphon through said filter bed.

5. The method of claim 4 which further includes the steps of siphoning said influent from said confining station to said filter bed through both said first and second siphons and filtering said influent siphoned by both said first and second siphons through said filter bed.

* * * * *